United States Patent Office 2,830,087
Patented Apr. 8, 1958

2,830,087

β-HYDROXYBUTYRIC ACID PARA-PHENETIDIDE AND A PROCESS FOR PREPARING IT

Gustav Ehrhart, Bad Soden (Taunus), and Heinrich Ott, Eppstein (Taunus), Germany, assignors to Farbwerke Hoechst Aktiengesellschaft vormals Meister Lucius & Brüning, Frankfurt am Main, Germany, a corporation of Germany No Drawing. Application January 31, 1956
Serial No. 562,583

Claims priority, application Germany February 21, 1955

1 Claim. (Cl. 260—562)

The present invention relates to β-hydroxybutyric acid para-phenetidide and a process for preparing it.

It is known that phenetidine derivatives, for example, acetic acid-para-phenetidide or lactic acid para-phenetidide, possess antipyretic and analgesic properties.

Now we have found that the para-phenetidide of the β-hydroxybutyric acid has an excellent analgesic action and at the same time a surprisingly low toxicity. The invention also includes a process for the manufacture of β-hydroxybutyric acid para-phenetidide, wherein acetoacetic acid para-phenetidide is subjected to reduction by a method in itself known.

The acetoacetic acid para-phenetidide used as starting compound is a known compound which can be prepared, for example, by the method described in "Beilstein," 1st supplement, volume 13, page 177.

The reduction of the carbonyl group can, for example, be carried out catalytically with the aid of a metal of the 8th group of the periodic system, and preferably with a nickel catalyst. A noble metal catalyst or Raney catalyst may also, for example, be used. The reduction can also be carried out with nascent hydrogen, for example, with aluminum amalgam and alcohol, with lithium aluminum hydride or with sodium borohydride. The reduction can also be carried out electrolytically.

β-Hydroxybutyric acid para-phenetidide is superior to the phenetidine derivatives hitherto known with regard to its low toxicity and analgesic action. For example, complete analgesia is produced in mice by the oral administration of 1.5 grams of this compound per kilogram of body weight. On the other hand, the same dose of para-acetyl-phenetidine or para-lactyl-phenetidine kills about 25 percent of the mice and does not produce complete analgesia.

The following examples serve to illustrate the invention, but they are not intended to limit it thereto, the parts being by weight, unless otherwise stated, and the relationship of parts by weight to parts by volume being the same as that of the kilogram to the litre.

*Example 1*

55 parts of acetoacetic acid para-phenetidide, suspended in 600 parts by volume of methanol, are hydrogenated at 80–85° C. with a nickel catalyst supported on kieselguhr. When the theoretical quantity of hydrogen has been absorbed, the solution is cooled, then filtered, and the filtrate is concentrated. The solid residue is recrystallized from six times its weight of isopropanol. β-Hydroxybutyric acid para-phenetidide is obtained in an almost quantitative yield in the form of white crystals which melt at 160° C.

*Example 2*

55 parts of acetoacetic acid para-phenetidide, suspended in 500 parts by volume of methanol, are hydrogenated with Raney nickel at 70° C. When the theoretical quantity of hydrogen has been absorbed, the solution is cooled, then filtered, and the filtrate is concentrated. The solid residue is recrystallized from six times its weight of isopropanol. 51 parts (93 percent of the theoretical yield) of β-hydroxybutyric acid para-phenetidide are obtained in the form of white crystals which are sparingly soluble in water and melt at 160° C.

*Example 3*

A mixture of 5 grams of aluminum amalgam, 5 grams of acetoacetic acid para-phenetidide and 50 cc. of ethanol are gently heated for 30 minutes. After filtering off the reducing agent with suction, water is added to the filtrate, and the latter is then acidified with 2 N-hydrochloric acid. β-Hydroxybutyric acid para-phenetidide melting at 160° C. crystallizes in almost quantitative yield in the form of white crystals.

We claim:

β-Hydroxybutyric acid para-phenetidide.

References Cited in the file of this patent

UNITED STATES PATENTS 503,743     Geromont            Aug. 22, 1893

FOREIGN PATENTS 12,166     Great Britain           May 6, 1893